US009203806B2

(12) United States Patent
Ahn et al.

(10) Patent No.: US 9,203,806 B2
(45) Date of Patent: Dec. 1, 2015

(54) RULE SWAPPING IN A PACKET NETWORK (71) Applicant: Centripetal Networks, Inc., Leesburg, VA (US)

(72) Inventors: David K. Ahn, Winston-Salem, NC (US); Steven Rogers, Leesburg, VA (US); Sean Moore, Hollis, NH (US)

(73) Assignee: Centripetal Networks, Inc., Herndon, VA (US)

( * ) Notice: Subject to any disclaimer, the term of this patent is extended or adjusted under 35 U.S.C. 154(b) by 333 days.

(21) Appl. No.: 13/739,178

(22) Filed: Jan. 11, 2013

(65) Prior Publication Data
US 2014/0201123 A1 Jul. 17, 2014

(51) Int. Cl.
*H04L 29/00* (2006.01)
*H04L 29/06* (2006.01)
*G06N 5/02* (2006.01)

(52) U.S. Cl.
CPC .............. *H04L 63/0263* (2013.01); *G06N 5/02* (2013.01)

(58) Field of Classification Search
CPC ................................ H04L 63/0263; G06N 5/02
See application file for complete search history.

(56) References Cited

U.S. PATENT DOCUMENTS

| 6,226,372 | B1 | 5/2001 | Beebe et al. |
| 6,317,837 | B1 | 11/2001 | Kenworthy |
| 6,611,875 | B1* | 8/2003 | Chopra et al. ............... 709/245 |
| 7,478,429 | B2 | 1/2009 | Lyon |
| 7,539,186 | B2 | 5/2009 | Aerrabotu et al. |
| 7,684,400 | B2 | 3/2010 | Govindarajan et al. |
| 7,710,885 | B2 | 5/2010 | Ilnicki et al. |
| 7,721,084 | B2 | 5/2010 | Salminen et al. |
| 7,818,794 | B2 | 10/2010 | Wittman |
| 8,004,994 | B1 | 8/2011 | Darisi et al. |
| 8,306,994 | B2 | 11/2012 | Kenworthy |
| 8,806,638 | B1* | 8/2014 | Mani ............................... 726/24 |
| 8,856,926 | B2 | 10/2014 | Narayanaswamy et al. |
| 8,935,785 | B2 | 1/2015 | Pandrangi |
| 2001/0039624 | A1 | 11/2001 | Kellum |
| 2002/0049899 | A1 | 4/2002 | Kenworthy |
| 2003/0035370 | A1 | 2/2003 | Brustoloni |
| 2003/0097590 | A1* | 5/2003 | Syvanne ....................... 713/201 |
| 2003/0123456 | A1 | 7/2003 | Denz et al. |

(Continued)

FOREIGN PATENT DOCUMENTS

| EP | 1313290 A1 | 5/2003 |
| EP | 1677484 A2 | 7/2006 |

(Continued)

OTHER PUBLICATIONS

International Search Report off International Application No. PCT/US2014/023286, dated Jun. 24, 2014.

(Continued)

*Primary Examiner* — Michael Pyzocha
(74) *Attorney, Agent, or Firm* — Banner & Witcoff, Ltd.

(57) ABSTRACT

In some variations, first and second rule sets may be received by a network protection device. The first and second rule sets may be preprocessed. The network protection device may be configured to process packets in accordance with the first rule set. Packets may be received by the network protection device. A first portion of the packets may be processed in accordance with the first rule set. The network protection device may be reconfigured to process packets in accordance with the second rule set. A second portion of the packets may be processed in accordance with the second rule set.

24 Claims, 9 Drawing Sheets

(56) References Cited

U.S. PATENT DOCUMENTS

| | | |
|---|---|---|
| 2003/0142681 A1 | 7/2003 | Chen et al. |
| 2003/0145225 A1 | 7/2003 | Bruton et al. |
| 2003/0154297 A1 | 8/2003 | Suzuki et al. |
| 2003/0188192 A1 | 10/2003 | Tang et al. |
| 2003/0212900 A1 | 11/2003 | Liu et al. |
| 2004/0088542 A1 | 5/2004 | Daude et al. |
| 2004/0151155 A1 | 8/2004 | Jouppi |
| 2005/0117576 A1 | 6/2005 | McDysan et al. |
| 2005/0138204 A1 | 6/2005 | Iyer et al. |
| 2005/0141537 A1 | 6/2005 | Kumar et al. |
| 2006/0048142 A1 | 3/2006 | Roese et al. |
| 2006/0114899 A1 | 6/2006 | Toumura et al. |
| 2006/0136987 A1 | 6/2006 | Okuda |
| 2006/0146879 A1 | 7/2006 | Anthias et al. |
| 2006/0195896 A1 | 8/2006 | Fulp et al. |
| 2006/0212572 A1 | 9/2006 | Afek et al. |
| 2006/0248580 A1* | 11/2006 | Fulp et al. ............. 726/11 |
| 2007/0083924 A1 | 4/2007 | Lu |
| 2007/0240208 A1 | 10/2007 | Yu et al. |
| 2008/0005795 A1 | 1/2008 | Acharya et al. |
| 2008/0072307 A1 | 3/2008 | Maes |
| 2008/0235755 A1 | 9/2008 | Blaisdell et al. |
| 2009/0172800 A1 | 7/2009 | Wool |
| 2009/0328219 A1* | 12/2009 | Narayanaswamy ......... 726/23 |
| 2010/0011434 A1 | 1/2010 | Kay |
| 2010/0082811 A1 | 4/2010 | Van Der Merwe et al. |
| 2010/0132027 A1 | 5/2010 | Ou |
| 2010/0211678 A1 | 8/2010 | McDysan et al. |
| 2010/0242098 A1 | 9/2010 | Kenworthy |
| 2010/0296441 A1 | 11/2010 | Barkan |
| 2011/0055916 A1 | 3/2011 | Ahn |
| 2011/0088092 A1 | 4/2011 | Nguyen et al. |
| 2011/0185055 A1 | 7/2011 | Nappier et al. |
| 2011/0270956 A1 | 11/2011 | McDysan et al. |
| 2012/0113987 A1 | 5/2012 | Riddoch et al. |
| 2012/0240135 A1* | 9/2012 | Risbood et al. ............ 719/328 |
| 2012/0264443 A1 | 10/2012 | Ng et al. |
| 2012/0314617 A1* | 12/2012 | Erichsen et al. ........... 370/254 |
| 2012/0331543 A1 | 12/2012 | Bostrom et al. |
| 2013/0059527 A1 | 3/2013 | Hasesaka et al. |
| 2013/0061294 A1 | 3/2013 | Kenworthy |
| 2013/0254766 A1 | 9/2013 | Zuo et al. |

FOREIGN PATENT DOCUMENTS

| | | |
|---|---|---|
| EP | 2385676 A1 | 11/2011 |
| EP | 2498442 A1 | 9/2012 |
| WO | 2005046145 A1 | 5/2005 |

OTHER PUBLICATIONS

"Build Security Into Your Network's DNA: The Zero Trust Network Architecture"; John Kindervag; Forester Research Inc.; Nov. 5, 2010.

"Designing a Zero Trust Network With Next-Generation Firewalls"; Palo Alto Networks: Technology Brief; last viewed on Oct. 21, 2012.

Reumann, John et al., "Adaptive Packet Filters," Department of Electrical Engineering and Computer Science, The University of Michigan, Ann Arbor, MI, IEEE, 2001.

Greenwald, Michael et al., "Designing an Academic Firewall: Policy, Practice, and Experience with SURF," Department of Computer Science, Stanford University, Stanford, CA, IEEE, Proceedings of SNDSS, 1996.

ISR off International Application No. PCT/US2014/027723, dated Jun. 26, 2014.

"SBIR Case Study: Centripetal Networks Subtitle: How CNI Leveraged DHS S&T SBIR Funding to Launch a Successful Cyber Security Company, Cyber Security Division, 2012 Principal Investigators' Meeting"; Sean Moore, Oct. 10, 2012.

"Control Plane Policing Implementation Best Practices"; Cisco Systems; Mar. 13, 2013; <https://web.archive.org/web/20130313135143/http:www.cisco.com/web/about/security/intelligence/coppwp_gs.html>.

International Search Report off PCT Application No. PCT/US2013/072566, mailed Mar. 24, 2014.

ISR for PCT/US2013/057502 dated Nov. 7, 2013.

Mizuno et al., A New Remote Configurable Firewall System for Home-use Gateways, NTT Information Sharing Platform Laboratories, IEEE, 2004.

Communication Relating to the Results of the Partial International Search for International App. No. PCT/US2015/024691, dated Jul. 10, 2015.

International Preliminary Report on Patentability for International App. No. PCT/US2013/072566, dated Jul. 23, 2015.

International Search Report and Written Opinion for International App. No. PCT/US2015/024691, dated Sep. 16, 2015.

International Preliminary Report on Patentability for International App. No. PCT/US2014/023286, dated Sep. 24, 2015.

International Preliminary Report on Patentability for International App. No. PCT/US2014/027723, dated Sep. 24, 2015.

* cited by examiner

RULE SWAPPING IN A PACKET NETWORK

BACKGROUND

Network protection devices (e.g., firewalls) implement rules with respect to packet-switched network traffic entering or leaving the networks they protect. Such devices compare the rules with the traffic. If a match is found, then the devices apply the actions associated with the rules to the traffic, e.g., the traffic may be allowed to cross the network boundary, or the traffic may be prevented from crossing the boundary. Such rules are often grouped into rule sets, which may form one or more network policies. As networks increase in complexity, the number of rules in a rule set may correspondingly increase. Similarly, the number of rules in a rule set may increase due to a desire on the part of an administrator to manage network traffic with a high level of granularity.

Network protection devices may require time to switch between rule sets. As rule sets increase in complexity, the time required for switching between them presents obstacles for effective implementation. For example, a network protection device may be unable to process network traffic while switching between rule sets due to the utilization of resources for implementing the new rule set. Additionally, while implementing a new rule set, a network protection device may continue processing packets in accordance with an outdated rule set. In certain circumstances (e.g., in the event of a network attack), such processing may exacerbate rather than mitigate the impetus for the rule set switch (e.g., the effect of the network attack).

SUMMARY

The following presents a simplified summary in order to provide a basic understanding of some aspects of the disclosure. It is neither intended to identify key or critical elements of the disclosure nor to delineate the scope of the disclosure. The following summary merely presents some concepts in a simplified form as a prelude to the description below.

In some variations, first and second rule sets may be received by a network protection device. The first and second rule sets may be preprocessed. For example, the first and second rule sets may be optimized to improve performance. The network protection device may be configured to process packets in accordance with the first rule set. Packets may be received by the network protection device. A first portion of the packets may be processed in accordance with the first rule set. The network protection device may be reconfigured to process packets in accordance with the second rule set. A second portion of the packets may be processed in accordance with the second rule set.

In some embodiments, the network protection device may include multiple processors. The processors, or a portion thereof, may be utilized for processing the first portion of the packets in accordance with the first rule set. Reconfiguring the network protection device to process packets in accordance with the second rule set may include synchronizing the processors. Synchronizing the processors may include signaling the processors to process packets in accordance with the second rule set. Responsive to signaling the processors to process packets in accordance with the second rule set, the processors may cease processing packets and may cache any unprocessed packets. The processors may be reconfigured to process packets in accordance with the second rule set. Once reconfigured, the processors may signal completion of the reconfiguration process. Responsive to signaling completion of the reconfiguration process, the processors may process the cached unprocessed packets in accordance with the second rule set.

In some embodiments, configuration information for configuring the network protection device to process packets in accordance with the first rule set may be stored. The stored configuration information may be utilized to reconfigure the network protection device to process packets in accordance with the first rule set, and a third portion of the packets may be processed in accordance with the first rule set.

In some embodiments, the first rule set may specify a set of network addresses for which packets should be forwarded and the second rule set may specify a set of network addresses for which packets should be forwarded. The second set of network addresses may include fewer network addresses than the first set. Alternatively, the second set of network addresses may include more network addresses than the first set.

In some embodiments, the first rule set may specify a set of network addresses for which packets should be dropped and the second rule set may specify a set of network addresses for which packets should be dropped. The second set of network addresses may include fewer network addresses than the first set. Alternatively, the second set of network addresses may include more network addresses than the first set.

In some embodiments, reconfiguring the network protection device to process packets in accordance with the second rule set may be performed in response to the network protection device receiving a message invoking the second rule set. Additionally or alternatively, reconfiguring the network protection device to process packets in accordance with the second rule set may be performed in response to one or more detected network conditions indicating a network attack.

Other details and features will be described in the sections that follow.

BRIEF DESCRIPTION OF THE DRAWINGS

Some features herein are illustrated by way of example, and not by way of limitation, in the figures of the accompanying drawings, in which like reference numerals refer to similar elements.

DETAILED DESCRIPTION

In the following description of various illustrative embodiments, reference is made to the accompanying drawings, which form a part hereof, and in which is shown, by way of illustration, various embodiments in which aspects of the disclosure may be practiced. It is to be understood that other embodiments may be utilized, and structural and functional modifications may be made, without departing from the scope of the present disclosure.

Various connections between elements are discussed in the following description. These connections are general and, unless specified otherwise, may be direct or indirect, wired or wireless, physical or logical. In this respect, the specification is not intended to be limiting.

Figure 1:
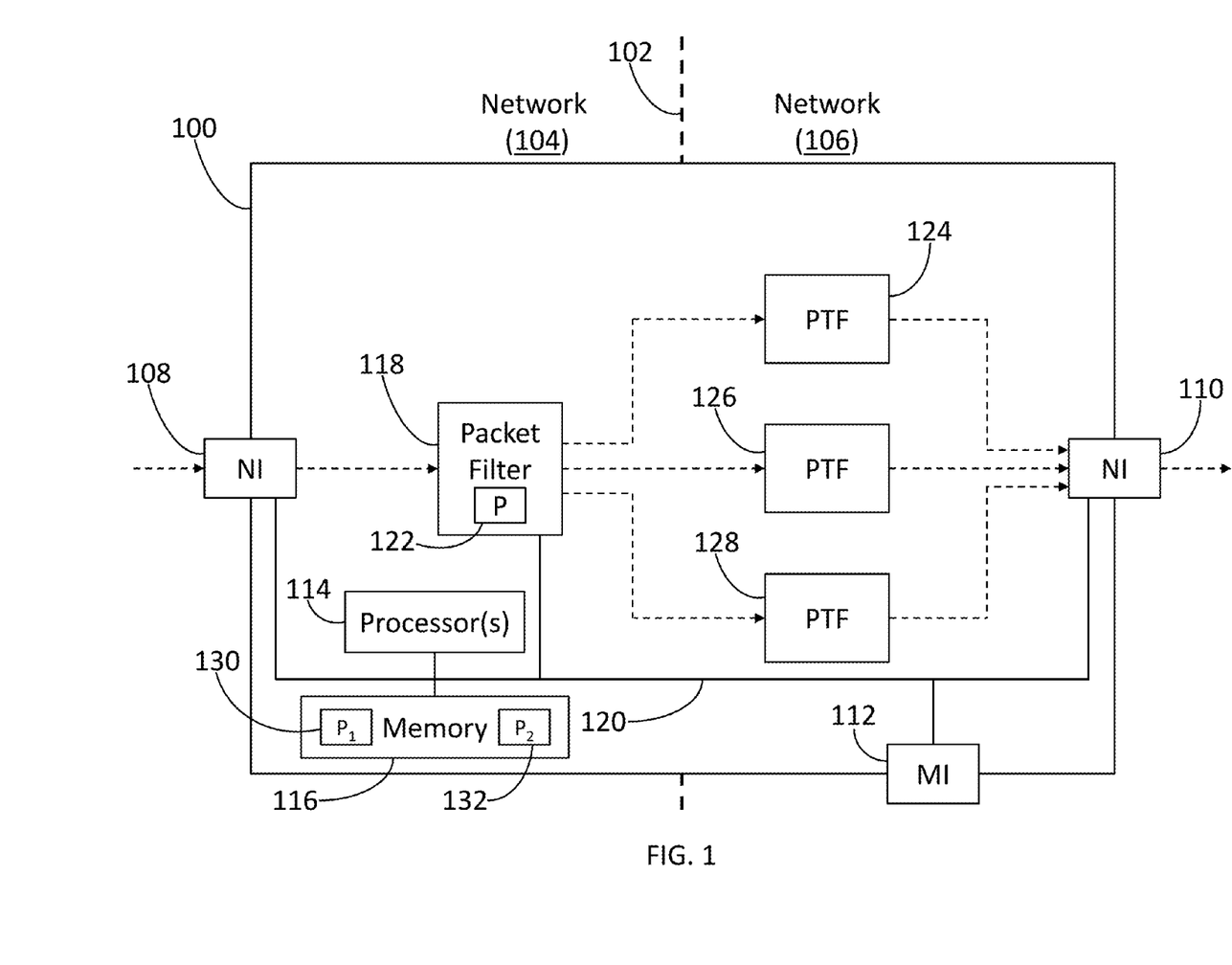
FIG. 1 illustrates an exemplary network protection device in which one or more aspects of the disclosure may be implemented.

FIG. 1 illustrates an exemplary network protection device in which one or more aspects of the disclosure may be implemented. Referring to FIG. 1, network protection device 100 may be located at boundary 102 between networks 104 and 106. As used herein, a network protection device includes any computing device having a processor, a memory, and a communication interface. Optionally, a network protection device may be configured to perform one or more additional functions as described herein. For example, network protection device 100 may be a firewall, gateway, router, or switch that interfaces networks 104 and 106. Network protection device 100 may include one or more network interfaces. For example, network protection device 100 may include network interface 108 for communicating with network 104, and network interface 110 for communicating with network 106. In some embodiments, network protection device 100 may include a management interface for providing an administrator with configuration access or provisioning network protection device 100 with one or more rule sets. For example, network protection device 100 may include management interface 112.

Network protection device 100 may also include one or more processors 114, memory 116, and packet filter 118. Network interfaces 108 and 110, management interface 112, processor(s) 114, memory 116, and packet filter 118 may be interconnected via data bus 120. Packet filter 118 may be configured to examine information specified by policy 122 with respect to packets received by network protection device 100 and forward the packets to one or more packet transformation functions specified by policy 122 based on the examined information. As used herein, a policy includes any combination of rules, rule sets, messages, instructions, files, data structures, or the like that specifies criteria corresponding to one or more packets and identifies a packet transformation function to be performed on packets corresponding to the specified criteria. Optionally, a policy may further specify one or more additional parameters as described herein.

Packet filter 118 may examine information specified by policy 122 with respect to packets received by network protection device 100 (e.g., packets received from network 104 via network interface 108) and forward the packets to one or more of packet transformation functions 124, 126, or 128 specified by policy 122 based on the examined information. Packet transformation functions 124, 126, and 128 may be configured to perform one or more functions on packets they receive from packet filter 118. For example, one or more of packet transformation functions 124, 126, and 128 may be configured to forward packets received from packet filter 118 into network 106, forward packets received from packet filter 118 to an Internet Protocol Security (IPsec) stack having an IPsec security association corresponding to the packets, or drop packets received from packet filter 118. Additionally or alternatively, one or more of packet transformation functions 124, 126, and 128 may be configured to forward one or more packets they receive to one or more other packet transformation functions (e.g., packet transformation function 124, 126, or 128), which may, in turn, perform one or more additional functions on the packets (e.g., log the packets, forward the packets into network 106, drop the packets, or forward the packets to one or more additional packet transformation functions for further processing). In some embodiments, one or more of packet transformation functions 124, 126, and 128 may be configured to drop packets by sending the packets to a local "infinite sink" (e.g., the /dev/null device file in a UNIX/LINUX system). U.S. patent application Ser. No. 13/657,010, filed Oct. 22, 2012, describes the use of packet transformation functions and is incorporated by reference herein in its entirety.

As indicated above, network protection devices (e.g., network protection device 100) may require time to switch between rule sets, and, as rule sets increase in complexity, the time required for switching between them may present obstacles for effective implementation. For example, memory 116 may include policies 130 and 132. Each of policies 130 and 132 may include a rule set. In some embodiments, memory 116 may store policies 130 and 132's rule sets in one or more buffers. The buffers may be statically sized to one or more predetermined sizes or the size of the buffers may be dynamically adjusted based on the size of policies 130 and 132's rule sets. In order to optimize network protection device 100's implementation of policies 130 and 132 the rule set contained within policy 130 or policy 132 may be preprocessed prior to its implementation by network protection device 100. For example, recent advances in packet filtering technology have reduced the time required to apply large rule sets to network traffic. United States Patent Application Publication Nos. 2006/0195896 and 2006/0248580 to Fulp et al., and United States Patent Application Publication No. 2011/0055916 to Ahn, describe such advanced packet filtering technologies, and are each incorporated by reference herein in their entireties. In some embodiments, preprocessing policies 130 and 132's rule sets may include merging two or more rules within the rule sets into one rule, separating one or more rules within the rule sets into two or more rules, or reordering one or more rules within the rule sets.

While preprocessing a rule set prior to its implementation may optimize its application to packets, preprocessing a rule set may be a resource intensive process that may require a substantial period of time. In certain contexts (e.g., initial setup) the time required for preprocessing may be of little moment; however, in other contexts (e.g., when rule sets are being swapped live), the time required for preprocessing a rule set may adversely affect the performance of network protection device 100. For example, network protection device 100 may preprocess policy 130's rule set and then implement the preprocessed rule set with respect to network traffic flowing between networks 104 and 106. Later, it may be desired to reconfigure network protection device 100 to implement policy 132's rule set with respect to network traffic flowing between networks 104 and 106. Accordingly, policy 132's rule set may be preprocessed and network protection device 100 may be reconfigured to implement the preprocessed rule set with respect to network traffic flowing between networks 104 and 106. Utilizing such an approach, however, may result in network protection device 100 having to devote resources to preprocessing policy 132's rule set while simultaneously implementing policy 130's rule set with respect to traffic flowing between networks 104 and 106. Thus, network protection device 100 may have to wait until preprocessing of policy 132's rule set is completed before switching to policy 132. Moreover, this period may be extended due to network protection device 100's ongoing implementation of policy 130's rule set with respect to traffic flowing between networks 104 and 106.

Figure 2:
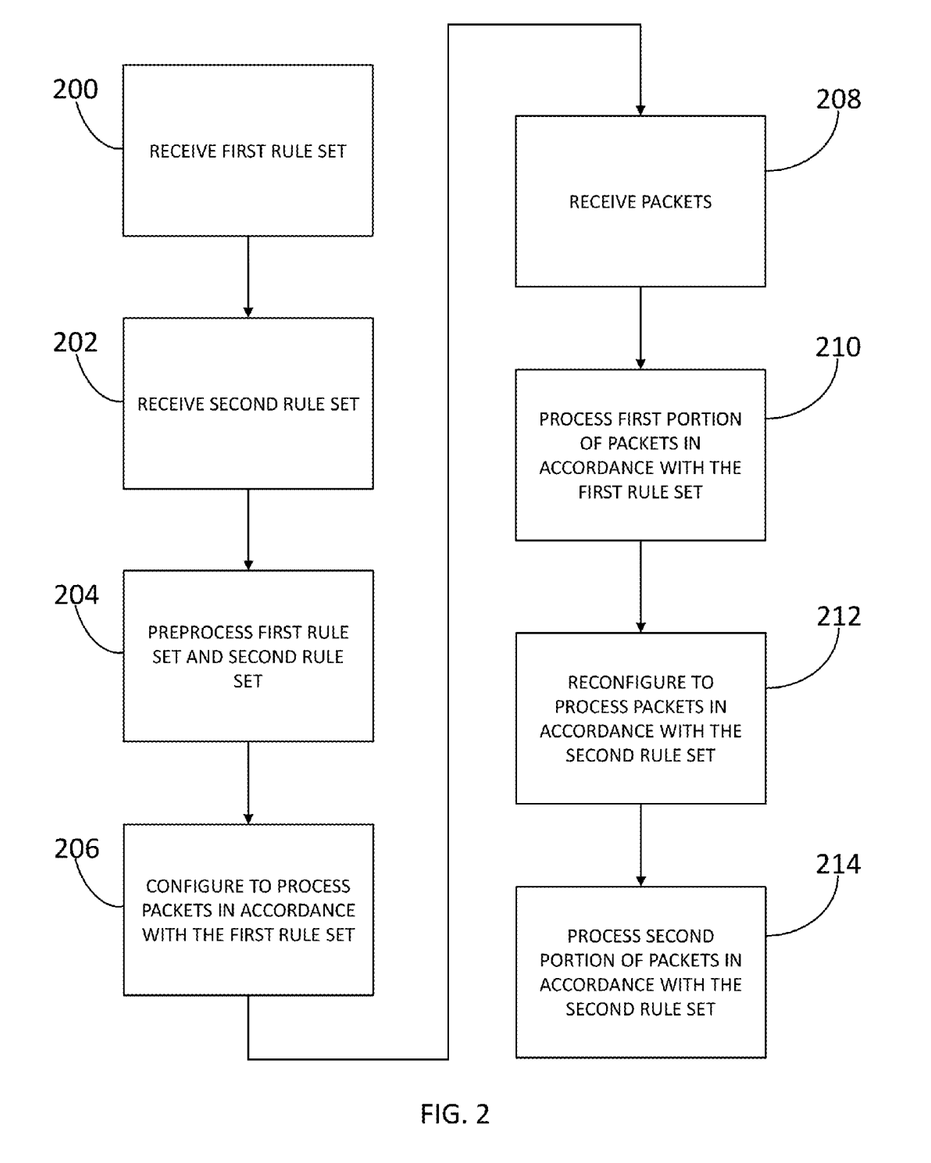
FIG. 2 illustrates an exemplary method for performing fast rule swapping.

In accordance with aspects of the disclosure, network protection device 100 may be configured to preprocess multiple rule sets prior to their implementation and thereby enable network protection device 100 to perform fast rule swapping between rule sets. FIG. 2 illustrates an exemplary method for performing fast rule swapping. Referring to FIG. 2, the steps may be performed by a network protection device, such as network protection device 100. At step 200, a first rule set may be received. For example, network protection device 100 may receive policy 130 via management interface 112. At step 202, a second rule set may be received. For example, network protection device 100 may receive policy 132 via management interface 112. At step 204, the first and second rule sets may be preprocessed. For example, network protection device 100 may preprocess both policy 130's rule set and policy 132's rule set. At step 206, the network protection device may be configured to process packets in accordance with the first rule set. For example, network protection device 100 may be configured to process packets flowing between networks 104 and 106 in accordance with policy 130's preprocessed rule set. At step 208, packets may be received. For example, network protection device 100 may receive packets from network 104 via network interface 108. At step 210, a first portion of the packets may be processed in accordance with the first rule set. For example, network protection device 100 may perform one or more packet transformation functions specified by policy 130's preprocessed rule set on a first portion of the packets received from network 104. At step 212, the network protection device may be reconfigured to process packets in accordance with the second rule set. For example, network protection device 100 may be reconfigured to process packets flowing between networks 104 and 106 in accordance with policy 132's preprocessed rule set. At step 214, a second portion of the packets may be processed in accordance with the second rule set. For example, network protection device 100 may perform one or more packet transformation functions specified by policy 132's preprocessed rule set on a second portion of the packets received from network 104.

It will be appreciated that by preprocessing both policy 130's rule set and policy 132's rule set prior to processing packets flowing between networks 104 and 106 in accordance with either of policy 130's rule set or policy 132's rule set, network protection device 100 may swap or switch between policy 130's rule set and policy 132's rule set more efficiently. For example, because policy 132's rule set is preprocessed prior to network protection device 100 being reconfigured to process packets in accordance with policy 132's rule set, network protection device 100 is not required to preprocess policy 132's rule set at the time network protection device 100 is switching between policy 130's rule set and policy 132's rule set. Moreover, network protection device 100 may be able to preprocess policy 132's rule set more efficiently because it may not be required to simultaneously process packets in accordance with policy 130's rule set.

In some embodiments, network protection device 100 may be configured to store configuration information associated with policy 130's rule set or policy 132's rule set. Such configuration information may later be utilized to reconfigure network protection device 100 to process packets in accordance with policy 130's rule set or policy 132's rule set (e.g., to swap or switch back to processing packets in accordance with a rule set network protection device 100 has previously processed packets in accordance with).

Due to the large number of rules a rule set may contain and the high volume of traffic a network protection device may be required to efficiently process, a network protection device may include multiple processors for processing packets in accordance with a rule set. Such a multi-processor network protection device may distribute packets amongst its processors for processing in accordance with a rule set.

Figure 3A:
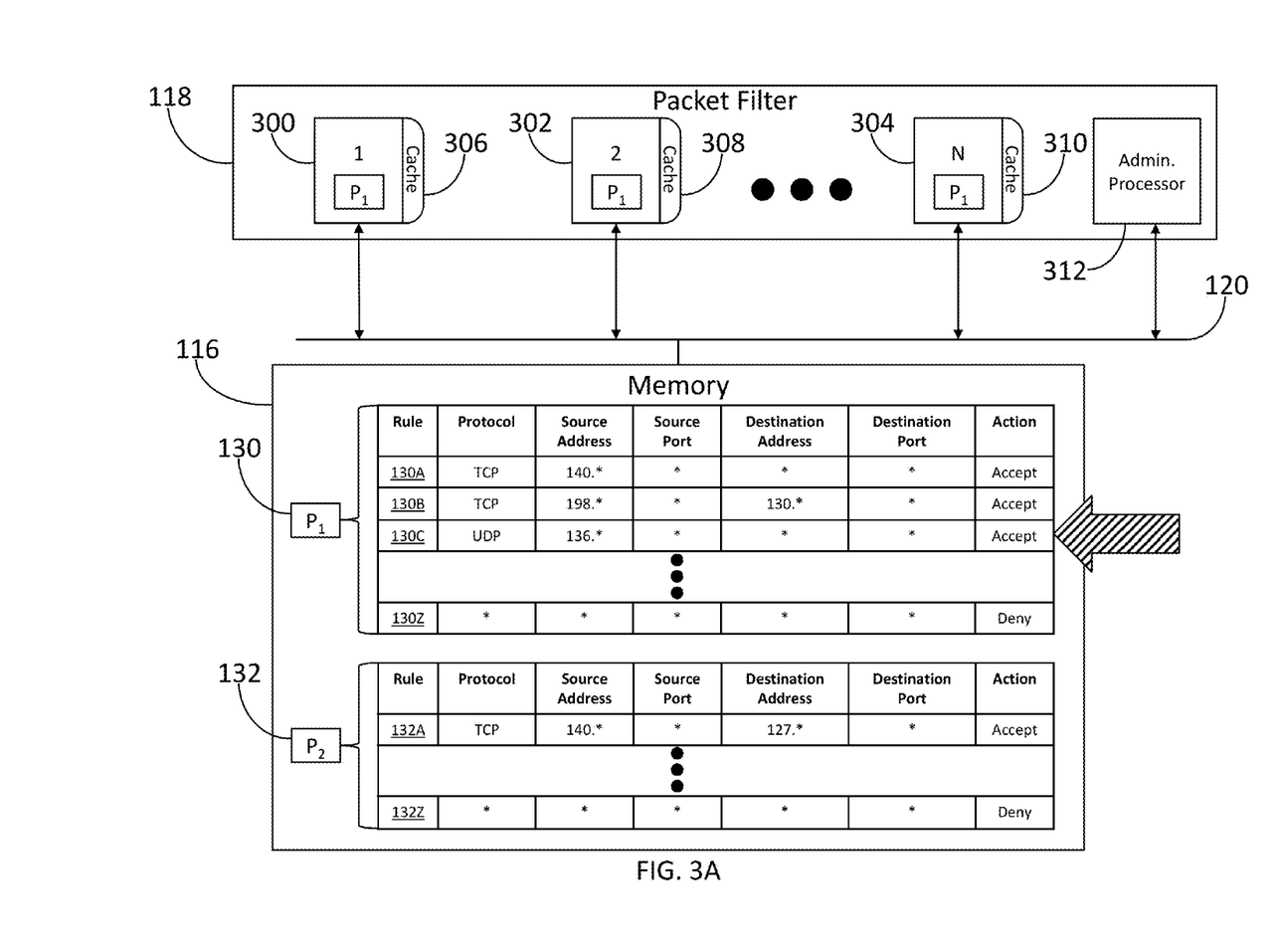
FIGS. 3A-3F illustrate aspects of an exemplary network protection device synchronizing multiple processors performing fast rule swapping.

FIGS. 3A-3F illustrate aspects of an exemplary network protection device synchronizing multiple processors performing fast rule swapping. Referring to FIG. 3A, as indicated above, network protection device 100 may include packet filter 118. Packet filter 118 may include one or more processor(s). For example, packet filter 118 may include processors 300, 302, and 304. Each of processors 300, 302, and 304 may be associated with a memory cache. For example, processor 300 may be associated with cache 306. Similarly, processor 302 may be associated with cache 308 and processor 304 may be associated with cache 310. Packet filter 118 may further include one or more administrative processors for controlling or coordinating its processors. For example, packet filter 118 may include administrative processor 312 for controlling or coordinating processors 300, 302, and 304. As indicated above, network protection device 100 may be configured to swap or switch between processing packets in accordance with one rule set to processing packets in accordance with a different rule set. In multi-processor embodiments, it may be advantageous to synchronize the processors involved in processing packets in accordance with the rule sets. For example, policy 130's rule set may include rules 130A, 130B, and 130C-130Z; and policy 132's rule set may include rules 132A-132Z. It will be appreciated, that either or both of policies 130 and 132's rule sets may include more than the number of rules illustrated (e.g., either or both of policies 130 and 132's rule sets may include hundreds of thousands or millions of individual rules).

Each of the individual rules within either of policies 130 or 132's rule sets may specify criteria (e.g., a set of network addresses) and an action (e.g., accept or deny) to be performed on packets matching the specified criteria. For example, rule 130A may specify that packets containing TCP packets, originating from a source IP address that begins with 140, having any source port, destined for any IP address, and destined for any port should have an accept packet transformation function performed on them. Similarly, rule 130B may specify that packets containing TCP packets, originating from a source IP address that begins with 198, having any source port, destined for an IP address that begins with 130, and destined for any port should have an accept packet transformation function performed on them; rule 130C may specify that packets containing UDP packets, originating from a source IP address that begins with 136, having any source port, destined for any IP address, and destined for any port should have an accept packet transformation function performed on them; rule 130Z may specify that packets containing packets of any protocol, originating from any IP source address, having any source port, destined for any IP address, and destined for any port should have a deny packet transformation function performed on them; rule 132A may specify that packets containing TCP packets, originating from a source IP address that begins with 140, having any source port, destined for any IP address than begins with 127, and destined for any port should have an accept packet transformation function performed on them; and rule 132Z may specify that packets containing packets of any protocol, originating from any IP source address, having any source port, destined for any IP address, and destined for any port should have a deny packet transformation function performed on them.

The individual rules of policies 130 and 132's rule sets may execute in a linear fashion. That is, a packet being processed in accordance with policy 130's rule set may first be compared to the criteria specified by rule 130A. If the packet matches the criteria specified by rule 130A, the corresponding action may be performed on the packet and packet filter 118's processor(s) may move on to the next packet. If the packet does not match the criteria specified by rule 130A, then the packet is compared to the criteria specified by the next rule (e.g., rule 130B), and so on, until the packet matches the criteria specified by a rule and the corresponding action is performed on the packet. Thus, for a multi-processor network protection device, individual processors may be comparing different individual packets to different rules within a given rule set when it is determined that the network protection device should swap or switch the rule set the packets are being processed in accordance with.

For example, at a time when it is determined that network protection device 100 should swap or switch from processing packets in accordance with policy 130's rule set to processing packets in accordance with policy 132's rule set, processor 300 may be beginning to process a packet than does not match the criteria of any of policy 130's rule set's rules other than rule 130Z. Thus, processor 300 may be required to compare the packet being processed to a large number of additional rules—potentially millions—before reaching the rule whose criteria the packet will match (e.g., rule 130Z). In contrast, at the time it is determined that network protection device 100 should swap or switch from processing packets in accordance with policy 130's rule set to processing packets in accordance with policy 132's rule set, processor 302 may be beginning to process a packet that matches the criteria specified by rule 130A, and will therefore process the packet relatively quickly compared to processor 300. Thus, if processors 300 and 302 each reconfigure to process packets in accordance with policy 132's rule set upon completion of processing their respective packets, processor 302 may begin processing packets in accordance with policy 132's rule set while processor 300 continues to process packets in accordance with policy 130's rule set. Accordingly, it may be advantageous to synchronize processors 300, 302, and 304's implementation of policy 132's rule set.

Figure 3B:
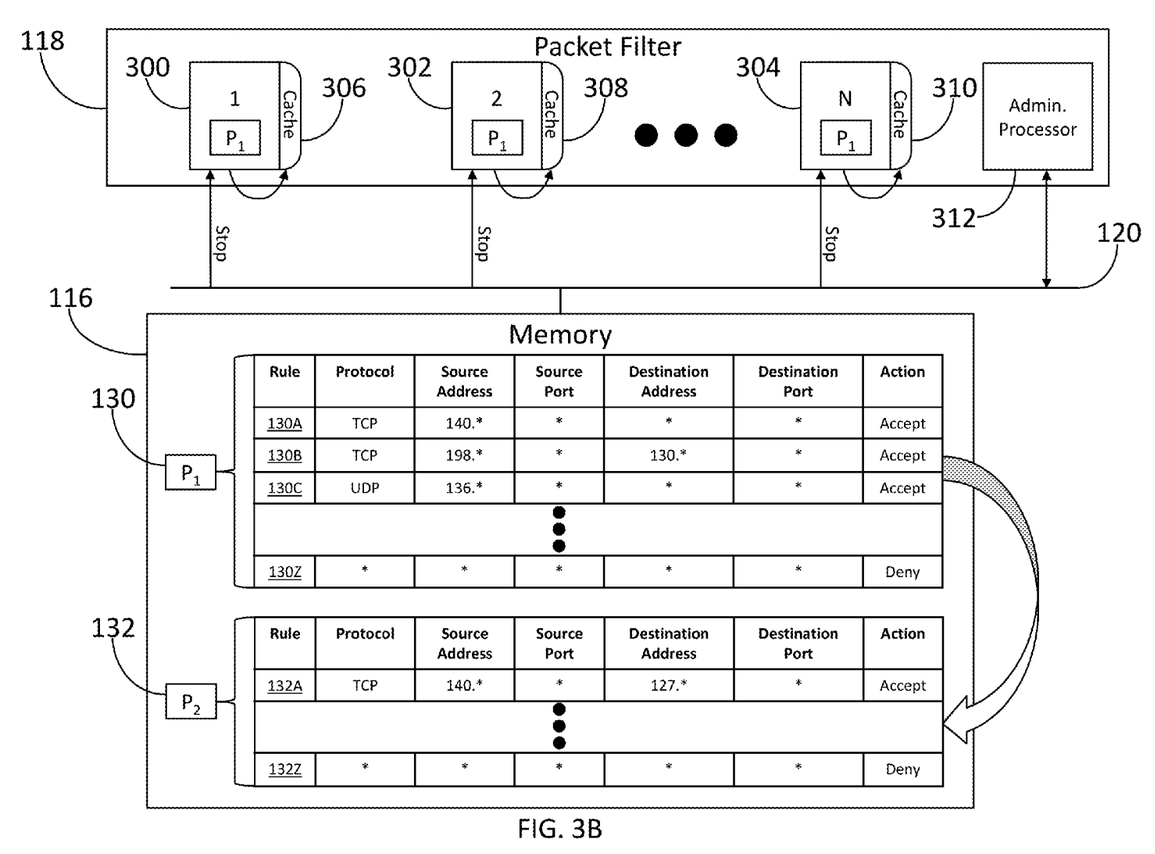

Referring to FIG. 3B, when it is determined that network protection device 100 should swap or switch from processing packets in accordance with policy 130's rule set to processing packets in accordance with policy 132's rule set, each of processors 300, 302, and 304 may be signaled by administrative processor 312 (e.g., via data bus 120) to stop processing packets. In some embodiments, processors 300, 302, and 304 may be signaled via the same channel over which they receive packets (e.g., data bus 120). For example, a control packet, indicting the policy swap, may be sent to each of processors 300, 302, and 304. In some embodiments, such a control packet may comprise a header value (e.g., a negative integer) that would not exist in a real network packet (e.g., a packet received from network 104). Additionally or alternatively, packets sent to processors 300, 302, and 304 may be encapsulated within meta packets and the meta packets may include information indicating whether they are control packets (e.g., packets indicating that processors 300, 302, and 304 should swap from processing packets in accordance with policy 130's rule set to processing packets in accordance with policy 132's rule set) or packets containing real network packets (e.g., packets received from network 104).

In some embodiments, each of processors 300, 302, and 304 may finish processing the packet they are currently processing and then cease processing packets. In other embodiments, each of processors 300, 302, and 304 may cease processing packets and cache the packet they are currently processing for future processing in accordance with policy 132's rule set. In any of the aforementioned embodiments, once a processor has ceased processing packets, it may cache any additional packets for future processing in accordance with policy 132's rule set. For example, processor 300 may cache any unprocessed packets in cache 306. Similarly, processor 302 may cache any unprocessed packets in cache 308 and processor 304 may cache any unprocessed packets in cache 310.

Figure 3C:
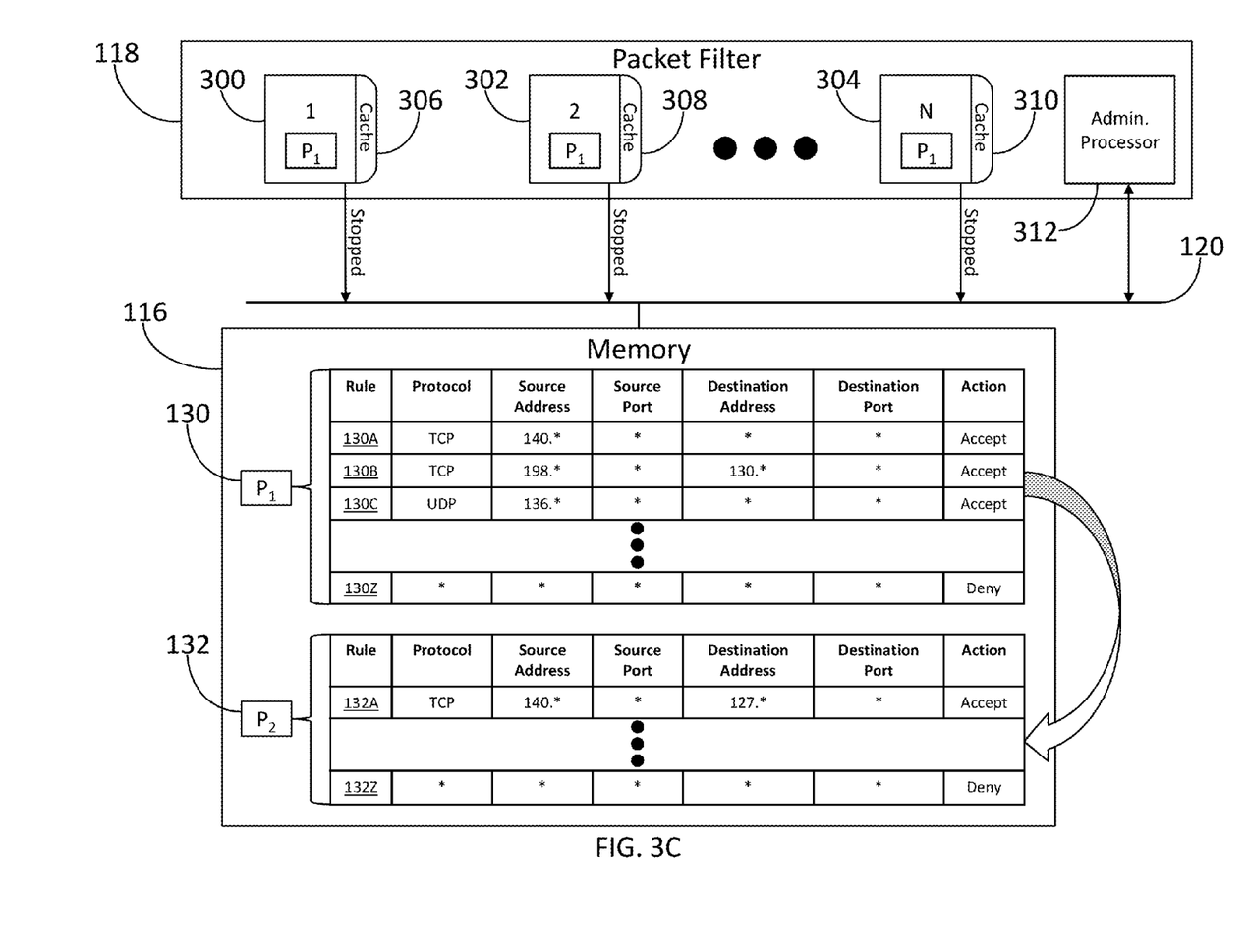
Figure 3D:
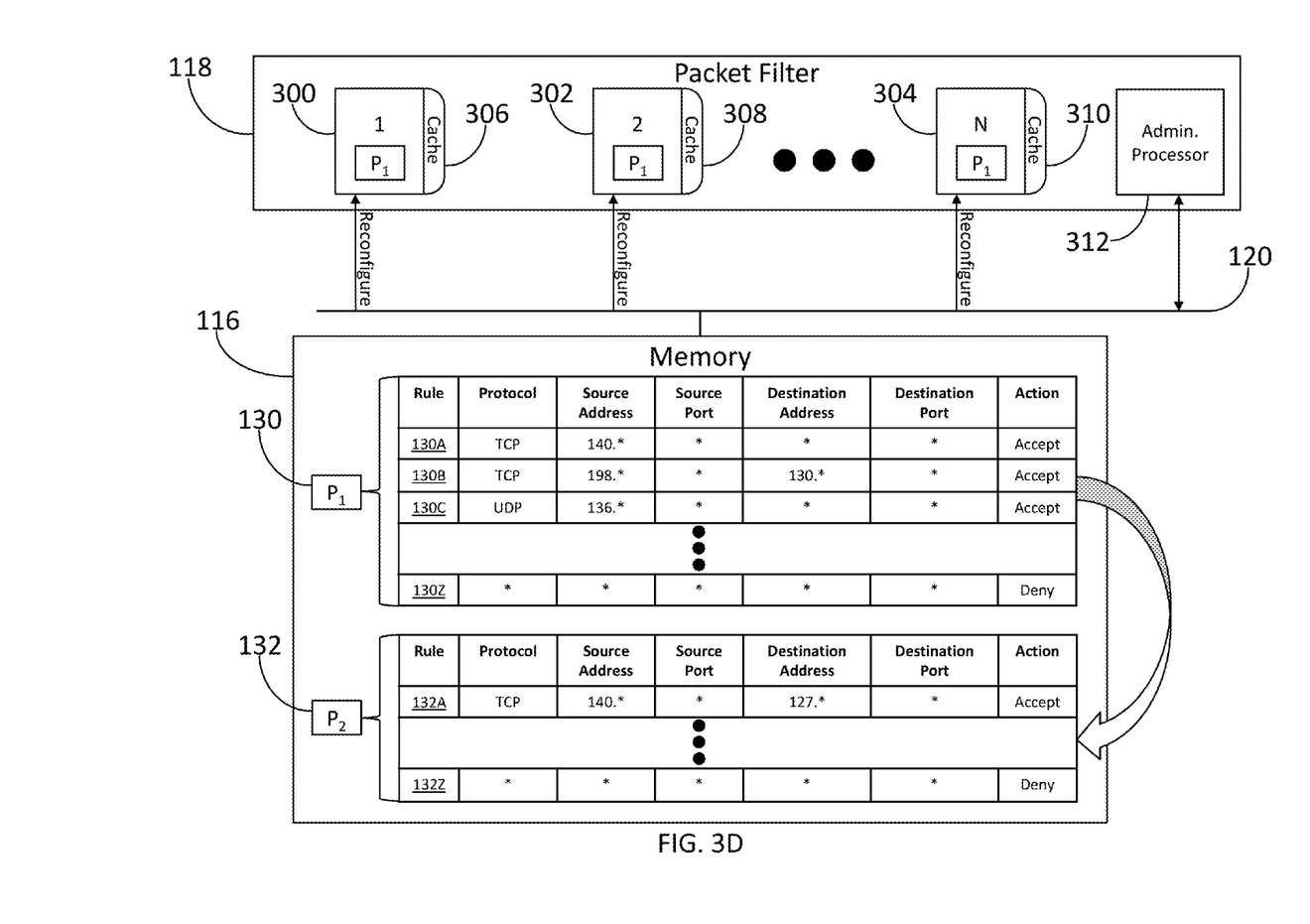
Figure 3E:
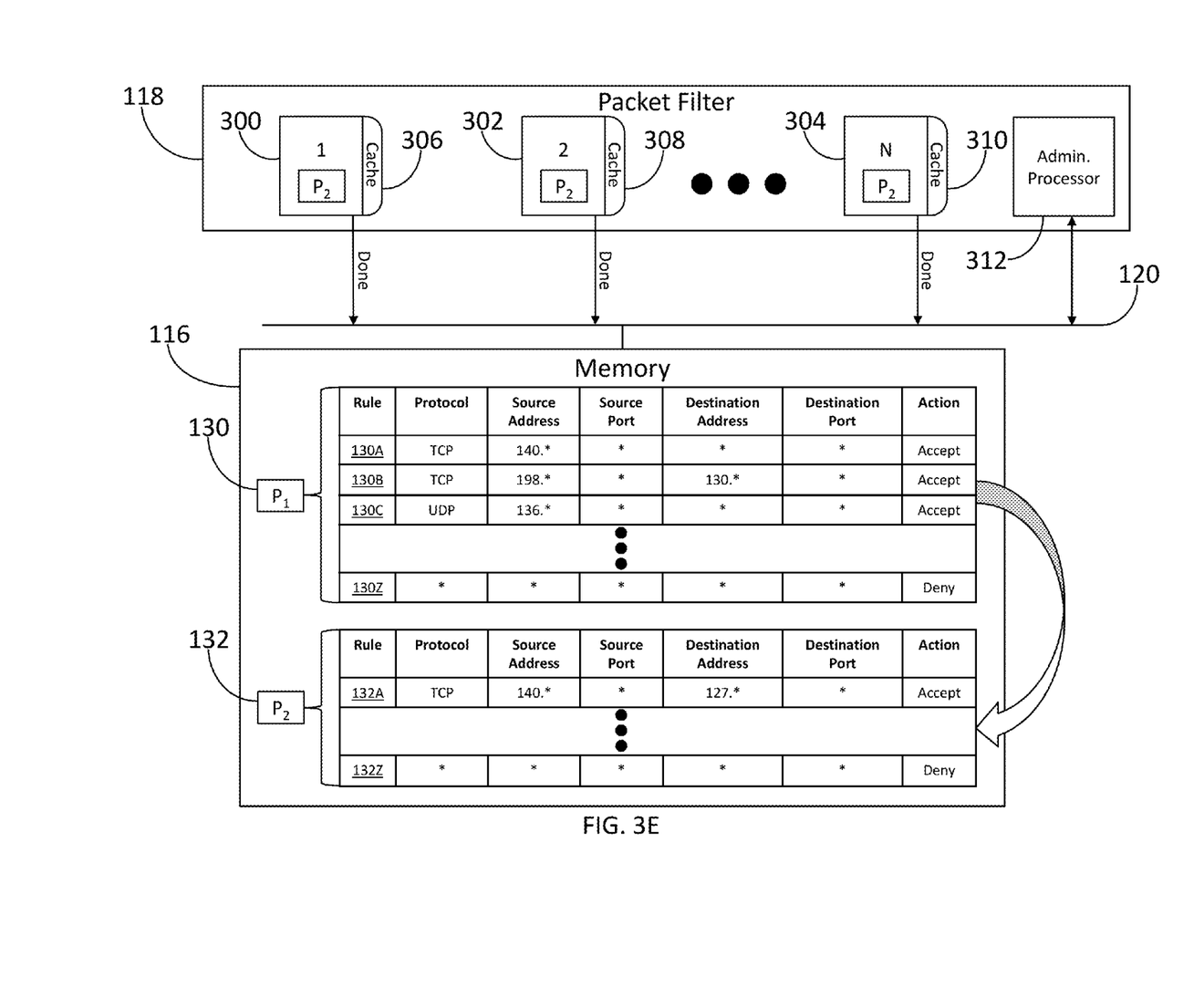
Figure 3F:
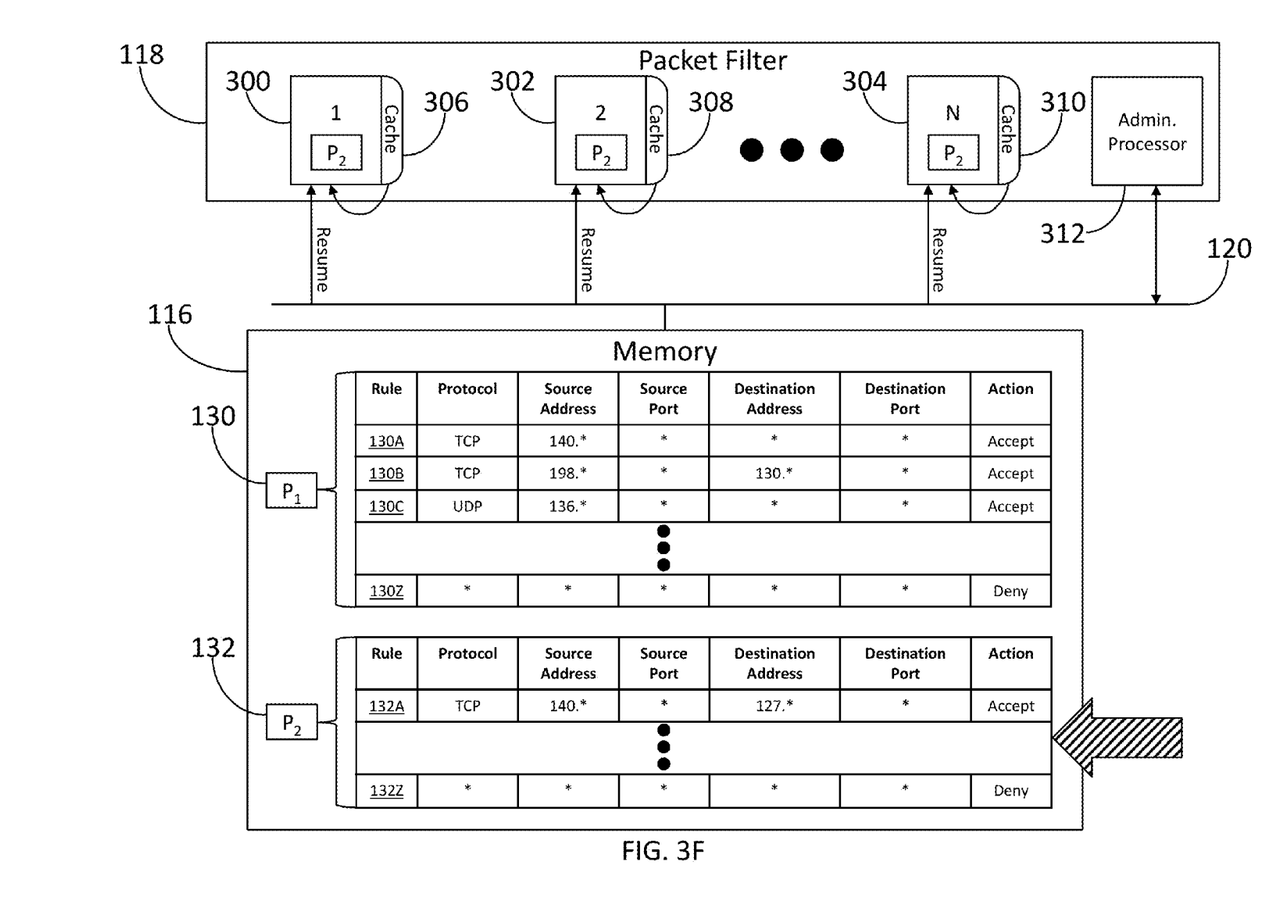

Referring to FIG. 3C, upon ceasing to process packets (e.g., when a current packet has been examined against the rules in policy 130's rule set), each of processors 300, 302, and 304 may signal administrative processor 312 that they have stopped processing packets. Referring to FIG. 3D, once each of processors 300, 302, and 304 have signaled that they have stopped processing packets, each of processors 300, 302, and 304 may be reconfigured to process packets in accordance with policy 132's rule set. Referring to FIG. 3E, once reconfigured to process packets in accordance with policy 132's rule set, each of processors 300, 302, and 304 may signal administrative processor 312 that they have been successfully reconfigured. Referring to FIG. 3F, once each of processors 300, 302, and 304 have signaled that they have been successfully reconfigured, each of processors 300, 302, and 304 may resume processing packets. For example, processors 300, 302, and 304 may begin by processing any packets respectively stored in caches 306, 308, and 310, and then may process additional packets received from network 104 via network interface 108.

By synchronizing the implementation of policy 132's rule set across processors 300, 302, and 304, packets processed by network protection device 100 at any given time may receive uniform treatment irrespective of the particular processor which handles them. Because both policy 130's rule set and policy 132's rule set may be preprocessed prior to processing any packets in accordance with either of policies 130 or 132's rule sets, the time required to reconfigure network protection device 100 to process packets in accordance with policy 132's rule set may be reduced. Reducing the time required to swap or switch between processing packets in accordance with policy 130's rule set and policy 132's rule set may be particularly advantageous in certain contexts. For example, policy 130's rule set may specify a set of network address for which packets should be accepted (e.g., a set of network addresses corresponding to devices for which communications should be supported under normal network conditions) and that all other packets should be denied. Policy 132's rule set may specify a smaller set of network addresses for which packets should be accepted than that specified by policy 130's rule set (e.g., a set of network addresses corresponding to devices for which communications should be supported under demanding network conditions), and may further specify that all other packets should be denied. In the event of a network attack (e.g., a Distributed Denial-of-Service (DDoS) attack) or detection of one or more network conditions indicating a network attack, network protection device 100 may switch from processing packets in accordance with policy 130's rule set to processing packets in accordance with policy 132's rule set (e.g., in an effort to mitigate the effects of the attack). Accordingly, the faster network protection device 100 can switch from processing packets in accordance with policy 130's rule set to processing packets in accordance with policy 132's rule set, the greater the likelihood that the effects of the attack may be mitigated.

Figure 4:
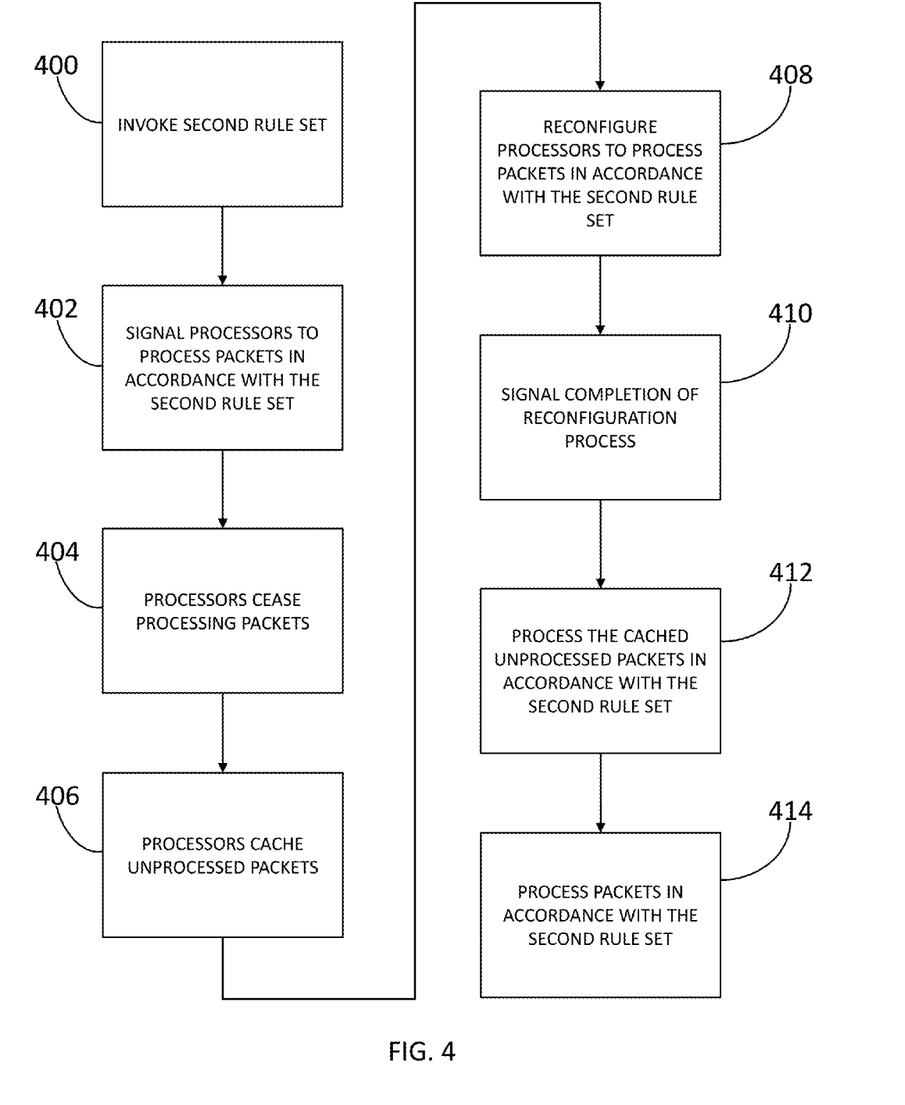
FIG. 4 illustrates an exemplary method for synchronizing multiple processors performing fast rule swapping.

FIG. 4 illustrates an exemplary method for synchronizing multiple processors performing fast rule swapping. Referring to FIG. 4, the steps may be performed by a network protection device, such as network protection device 100. At step 400, the second rule set may be invoked. For example, network protection device 100 may receive a message invoking policy 132's rule set or one or more network conditions indicating a network attack may be detected. At step 402, one or more of the network protection device's processors responsible for processing packets may be signaled to process packets in accordance with the second rule set. For example, processors 300, 302, and 304 may be signaled to process packets in accordance with policy 132's rule set. At step 404, the one or more processors of the network protection device responsible for processing packets may cease processing packets. For example, each of processors 300, 302, and 304 may cease processing packets in accordance with policy 300's rule set. At step 406, the one or more processors of the network protection device responsible for processing packets may cache any unprocessed packets. For example, each of processors 300, 302, and 304 may respectively cache any unprocessed packets in caches 306, 308, and 310. At step 408, the one or more processors of the network protection device responsible for processing packets may be reconfigured to process packets in accordance with the second rule set. For example, each of processors 300, 302, and 304 may be reconfigured to process packets in accordance with policy 132's rule set. At step 410, the one or more processors of the network protection device responsible for processing packets may signal completion of the reconfiguration process. For example, each of processors 300, 302, and 304 may signal completion of their respective reconfiguration processes. At step 412, the one or more processors of the network protection device responsible for processing packets may process any cached unprocessed packets in accordance with the second rule set. For example, each of processors 300, 302, and 304 may respectively process any unprocessed packets previously cached in caches 306, 308, and 310 in accordance with policy 132's rule set. At step 414, additional packets may be processed in accordance with the second rule set. For example, each of processors 300, 302, and 304 may process additional packets received from network 104 in accordance with policy 132's rule set.

The functions and steps described herein may be embodied in computer-usable data or computer-executable instructions, such as in one or more program modules, executed by one or more computers or other devices to perform one or more functions described herein. Generally, program modules include routines, programs, objects, components, data structures, etc. that perform particular tasks or implement particular abstract data types when executed by one or more processors in a computer or other data processing device. The computer-executable instructions may be stored on a computer-readable medium such as a hard disk, optical disk, removable storage media, solid state memory, RAM, etc. As will be appreciated, the functionality of the program modules may be combined or distributed as desired in various embodiments. In addition, the functionality may be embodied in whole or in part in firmware or hardware equivalents, such as integrated circuits, application-specific integrated circuits (ASICs), field programmable gate arrays (FPGA), and the like. Particular data structures may be used to more effectively implement one or more aspects of the disclosure, and such data structures are contemplated to be within the scope of computer executable instructions and computer-usable data described herein.

Although not required, one of ordinary skill in the art will appreciate that various aspects described herein may be embodied as a method, an apparatus, or as one or more computer-readable media storing computer-executable instructions. Accordingly, those aspects may take the form of an entirely hardware embodiment, an entirely software embodiment, an entirely firmware embodiment, or an embodiment combining software, hardware, and firmware aspects in any combination.

As described herein, the various methods and acts may be operative across one or more computing servers and one or more networks. The functionality may be distributed in any manner, or may be located in a single computing device (e.g., a server, a client computer, etc.).

Aspects of the disclosure have been described in terms of illustrative embodiments thereof. Numerous other embodiments, modifications, and variations within the scope and spirit of the appended claims will occur to persons of ordinary skill in the art from a review of this disclosure. For example, one of ordinary skill in the art will appreciate that the steps illustrated in the illustrative figures may be performed in other than the recited order, and that one or more steps illustrated may be optional.

What is claimed is:

1. A method comprising:
   receiving, by a network protection device, a first rule set and a second rule set;
   preprocessing, by the network protection device, the first rule set and the second rule set to optimize performance of the network protection device for processing packets in accordance with at least one of the first rule set or the second rule set;
   configuring at least two processors of the network protection device to process packets in accordance with the first rule set;
   after the preprocessing and the configuring, receiving, by the network protection device, a plurality of packets;
   processing, by the network protection device and in accordance with the first rule set, a portion of the plurality of packets;
   signaling, each processor of the at least two processors, to process packets in accordance with the second rule set; and
   configuring, each processor of the at least two processors, to responsive to the signaling to process packets in accordance with the second rule set:
   cease processing of one or more packets;
   cache the one or more packets;
   reconfigure to process packets in accordance with the second rule set;
   signal completion of reconfiguration to process packets in accordance with the second rule set; and
   responsive to receiving signaling that each other processor of the at least two processors has completed reconfiguration to process packets in accordance with the second rule set, process, in accordance with the second rule set, the one or more packets.

2. The method of claim 1, comprising:
   storing, by the network protection device, configuration information for processing packets in accordance with the first rule set;
   utilizing, by the network protection device, the configuration information to reconfigure to process packets in accordance with the first rule set; and
   after the utilizing, processing, by the network protection device and in accordance with the first rule set, an additional portion of the plurality of packets.

3. The method of claim 1, comprising:
   storing, by the network protection device, the first rule set and the second rule set in a memory buffer; and
   dynamically adjusting, by the network protection device and based on at least one of a size of the first rule set or a size of the second rule set, a size of the memory buffer.

4. The method of claim 1, wherein the signaling to process packets in accordance with the second rule set is performed in response to the network protection device receiving a message invoking the second rule set.

5. The method of claim 1, wherein the signaling to process packets in accordance with the second rule set is performed in response to one or more detected network conditions indicating a network attack.

6. The method of claim 1, wherein the preprocessing comprises merging two or more rules included in at least one of the first rule set or the second rule set into a single rule.

7. The method of claim 1, wherein the preprocessing comprises separating a rule included in at least one of the first rule set or the second rule set into two or more rules.

8. The method of claim 1, wherein the preprocessing comprises reordering one or more rules included in at least one of the first rule set or the second rule set.

9. A system comprising:
a plurality of processors; and
a memory comprising instructions that when executed by at least one processor of the plurality of processors cause the system to:
receive a first rule set and a second rule set;
preprocess the first rule set and the second rule set to optimize performance of the system for processing packets in accordance with at least one of the first rule set or the second rule set;
configure at least two processors of the plurality of processors to process packets in accordance with the first rule set;
after preprocessing the first rule set and the second rule set and configuring the at least two processors to process packets in accordance with the first rule set, receive a plurality of packets;
process, in accordance with the first rule set, a portion of the plurality of packets;
signal, each processor of the at least two processors, to process packets in accordance with the second rule set; and
configure, each processor of the at least two processors to, responsive to being signaled to process packets in accordance with the second rule set:
cease processing of one or more packets;
cache the one or more packets;
reconfigure to process packets in accordance with the second rule set;
signal completion of reconfiguration to process packets in accordance with the second rule set; and
responsive to receiving signaling that each other processor of the at least two processors has completed reconfiguration to process packets in accordance with the second rule set, process, in accordance with the second rule set, the one or more packets.

10. The system of claim 9, wherein the instructions, when executed by the at least one processor, cause the system to:
store configuration information for processing packets in accordance with the first rule set;
utilize the configuration information to reconfigure to process packets in accordance with the first rule set; and
after utilizing the configuration information to reconfigure to process packets in accordance with the first rule set, process, in accordance with the first rule set, an additional portion of the plurality of packets.

11. The system of claim 9, wherein the instructions, when executed by the at least one processor, cause the system to:
store the first rule set and the second rule set in a memory buffer; and
dynamically adjust, based on at least one of a size of the first rule set or a size of the second rule set, a size of the memory buffer.

12. The system of claim 9, wherein the instructions, when executed by the at least one processor, cause the system to signal to process packets in accordance with the second rule set in response to the system receiving a message invoking the second rule set.

13. The system of claim 9, wherein the instructions, when executed by the at least one processor, cause the system to signal to process packets in accordance with the second rule set in response to one or more detected network conditions indicating a network attack.

14. The system of claim 9, wherein the instructions, when executed by the at least one processor, cause the system to, prior to configuring the at least two processors to process packets in accordance with the first rule set, merge two or more rules included in at least one of the first rule set or the second rule set into a single rule.

15. The system of claim 9, wherein the instructions, when executed by the at least one processor, cause the system to, prior to configuring the at least two processors to process packets in accordance with the first rule set, separate a rule included in at least one of the first rule set or the second rule set into two or more rules.

16. The system of claim 9, wherein the instructions, when executed by the at least one processor, cause the system to, prior to configuring the at least two processors to process packets in accordance with the first rule set, reorder one or more rules included in at least one of the first rule set or the second rule set.

17. One or more non-transitory computer-readable media comprising instructions that when executed by a computing system cause the computing system to:
receive a first rule set and a second rule set;
preprocess the first rule set and the second rule set to optimize performance of the computing system for processing packets in accordance with at least one of the first rule set or the second rule set;
configure at least two processors of the computing system to process packets in accordance with the first rule set;
after preprocessing the first rule set and the second rule set and configuring the at least two processors to process packets in accordance with the first rule set, receive a plurality of packets;
process, in accordance with the first rule set, a portion of the plurality of packets;
signal, each processor of the at least two processors, to process packets in accordance with the second rule set; and
configure, each processor of the at least two processors to, responsive to being signaled to process packets in accordance with the second rule set:
cease processing of one or more packets;
cache the one or more packets;
reconfigure to process packets in accordance with the second rule set;
signal completion of reconfiguration to process packets in accordance with the second rule set; and
responsive to receiving signaling that each other processor of the at least two processors has completed reconfiguration to process packets in accordance with the second rule set, process, in accordance with the second rule set, the one or more packets.

18. The one or more non-transitory computer-readable media of claim 17, wherein the instructions, when executed by the computing system, cause the computing system to:

store configuration information for processing packets in accordance with the first rule set;

utilize the configuration information to reconfigure to process packets in accordance with the first rule set; and after utilizing the configuration information to reconfigure to process packets in accordance with the first rule set, process, in accordance with the first rule set, an additional portion of the plurality of packets.

19. The one or more non-transitory computer-readable media of claim 17, wherein the instructions, when executed by the computing system, cause the computing system to:

store the first rule set and the second rule set in a memory buffer; and dynamically adjust, based on at least one of a size of the first rule set or a size of the second rule set, a size of the memory buffer.

20. The one or more non-transitory computer-readable media of claim 17, wherein the instructions, when executed by the computing system, cause the computing system to signal to process packets in accordance with the second rule set in response to the computing system receiving a message invoking the second rule set.

21. The one or more non-transitory computer-readable media of claim 17, wherein the instructions, when executed by the computing system, cause the computing system to signal to process packets in accordance with the second rule set in response to one or more detected network conditions indicating a network attack.

22. The one or more non-transitory computer-readable media of claim 17, wherein the instructions, when executed by the computing system, cause the computing system to, prior to configuring the at least two processors to process packets in accordance with the first rule set, merge two or more rules included in at least one of the first rule set or the second rule set into a single rule.

23. The one or more non-transitory computer-readable media of claim 17, wherein the instructions, when executed by the computing system, cause the computing system to, prior to configuring the at least two processors to process packets in accordance with the first rule set, separate a rule included in at least one of the first rule set or the second rule set into two or more rules.

24. The one or more non-transitory computer-readable media of claim 17, wherein the instructions, when executed by the computing system, cause the computing system to, prior to configuring the at least two processors to process packets in accordance with the first rule set, reorder one or more rules included in at least one of the first rule set or the second rule set.

* * * * *